US012528667B2

(12) United States Patent
Roberts

(10) Patent No.: US 12,528,667 B2
(45) Date of Patent: Jan. 20, 2026

(54) AUTONOMOUS ELEVATOR CAR MOVER CONFIGURED FOR SELF-LEARNING LATERAL CLEARANCE CONTROL

(71) Applicant: Otis Elevator Company, Farmington, CT (US)

(72) Inventor: Randy Roberts, Hebron, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1530 days.

(21) Appl. No.: 16/994,892

(22) Filed: Aug. 17, 2020

(65) Prior Publication Data

US 2022/0048729 A1 Feb. 17, 2022

(51) Int. Cl.

| | |
|---|---|
| ***B66B 1/30*** | (2006.01) |
| ***B66B 1/34*** | (2006.01) |
| ***B66B 9/02*** | (2006.01) |
| ***B66B 11/04*** | (2006.01) |

(52) U.S. Cl.

CPC .................. *B66B 1/30* (2013.01); *B66B 9/02* (2013.01); *B66B 11/043* (2013.01); *B66B 1/3446* (2013.01); *B66B 1/3461* (2013.01); *B66B 2201/307* (2013.01); *B66B 2201/402* (2013.01)

(58) Field of Classification Search

CPC ........... B66B 1/30; B66B 9/02; B66B 11/043; B66B 1/3446; B66B 1/3461; B66B 2201/307; B66B 2201/402; B66B 5/0018; B66B 11/0438; B66B 1/2433

See application file for complete search history.

(56) References Cited

U.S. PATENT DOCUMENTS 5,430,642 A * 7/1995 Nakajima ................ H05B 1/00 700/149
5,544,721 A * 8/1996 Roberts ................... B66B 7/043 187/292

(Continued)

FOREIGN PATENT DOCUMENTS

| | | |
|---|---|---|
| EP | 0503972 A2 | 9/1992 |
| EP | 1860051 A1 | 11/2007 |
| EP | 3466857 A1 | 4/2019 |

OTHER PUBLICATIONS

European Search Report; Issued: Jan. 4, 2022; Application No. 21191375.1; Filed: Aug. 13, 2021; 11 pages.

*Primary Examiner* — Jeffrey Donels
(74) *Attorney, Agent, or Firm* — CANTOR COLBURN LLP

(57) ABSTRACT

A car mover for autonomously moving an elevator car along a lane in a hoistway, including: first and second wheels of the car mover, configured to apply a pinch force against a track therebetween and to rotationally drive along the track, by respective first and second wheel motors of the car mover; and a controller configured to execute: a lateral clearance control self-learning module, wherein based on adjustment data, one or more operational parameters applied by one or more of the first and second wheel motors are adjusted; and a lateral clearance feedback control module, wherein based on one or more of a first lateral clearance adjacent the first wheel on the track and a second lateral clearance adjacent the second wheel on the track, torque applied by one or more of the first and second wheel motors is increased or decreased.

20 Claims, 8 Drawing Sheets

(56) References Cited

U.S. PATENT DOCUMENTS

| | | | | |
|---|---|---|---|---|
| 5,715,914 A * | 2/1998 | Traktovenko | B66B 7/046 187/406 |
| 9,643,815 B2 * | 5/2017 | Wei | B66B 1/32 |
| 11,584,621 B2 * | 2/2023 | Bhaskar | B66B 11/005 |

* cited by examiner

AUTONOMOUS ELEVATOR CAR MOVER CONFIGURED FOR SELF-LEARNING LATERAL CLEARANCE CONTROL

BACKGROUND

Embodiments described herein relate to a multi-car elevator system and more specifically to an autonomous elevator car mover configured for self-learning lateral clearance control.

An autonomous elevator car mover may use motor-driven wheels to propel the elevator car up and down on vertical track beams, which may be I-beams, having respective webs that form front and back track surfaces. Two elements to this system include the elevator car which will be guided by rollers guides on traditional T-rails, and the autonomous car mover which will house two (2) to four (4) motor-driven wheels. An operational goal of the car mover is for the wheels to maintain alignment while traveling along a track during runs.

BRIEF SUMMARY

A car mover for autonomously moving an elevator car along a lane in a hoistway, including: first and second wheels of the car mover, configured to apply a pinch force against a track therebetween and to rotationally drive along the track, by respective first and second wheel motors of the car mover; and a controller configured to execute: a lateral clearance control self-learning module, wherein based on adjustment data, one or more operational parameters applied by one or more of the first and second wheel motors are adjusted; and a lateral clearance feedback control module, wherein based on one or more of a first lateral clearance adjacent the first wheel on the track and a second lateral clearance adjacent the second wheel on the track, torque applied by one or more of the first and second wheel motors is increased or decreased.

In addition to one or more aspects of the car mover, or as an alternate, the adjustment data represents prior adjustments to the first and second wheel motors from prior runs of the car mover.

In addition to one or more aspects of the car mover, or as an alternate, from the adjustment data, the controller is configured to adjust an effective diameter of the first and second wheels relative to each other.

In addition to one or more aspects of the car mover, or as an alternate, in operation, the controller is configured to adjust one or more of velocity and torque, after an identified destination is reached, or after a predetermined period of time or operational runs is reached by the car mover.

In addition to one or more aspects of the car mover, or as an alternate, the adjustment data is obtained via a log of adjustments to the first and second wheel motors from prior runs of the car mover.

In addition to one or more aspects of the car mover, or as an alternate, the adjustment data is derived as one or more of: a weighted average applied to the log of adjustments to the first and second wheel motors from previous runs of the car mover; and a correction factor based on the log of adjustments to the first and second wheel motors from previous runs of the car mover.

In addition to one or more aspects of the car mover, or as an alternate, a sensor operationally connected to the car mover is configured to sense the first lateral clearance adjacent the first wheel on the track and the second lateral clearance adjacent the second wheel on the track.

In addition to one or more aspects of the car mover, or as an alternate, the sensor is configured to transmit sensor data indicative of the first and second lateral clearances to the controller via a wired or wireless transmission channel.

In addition to one or more aspects of the car mover, or as an alternate, the sensor is configured to transmit the sensor data to the controller over the wireless transmission channel, directly or via a cloud service.

In addition to one or more aspects of the car mover, or as an alternate, the sensor data is configured to processed, at least in part, by one more of the sensor via edge computing, the controller, and the cloud service.

A method of operating a car mover for autonomously moving an elevator car along a lane in a hoistway, including: applying a pinch force against a track between first and second wheels of the car mover, and rotationally driving along the track, by respective first and second wheel motors of the car mover; and executing, by a controller, a lateral clearance control self-learning module, wherein based on adjustment data, one or more operational parameters applied by one or more of the first and second wheel motors are adjusted; and executing, by the controller, a lateral clearance feedback control module, wherein based on one or more of a first lateral clearance adjacent the first wheel on the track and a second lateral clearance adjacent the second wheel on the track, torque applied by one or more of the first and second wheel motors is increased or decreased.

In addition to one or more aspects of the method, or as an alternate, the adjustment data represents prior adjustments to the first and second wheel motors from prior runs of the car mover.

In addition to one or more aspects of the method, or as an alternate, the method includes adjusting, by the controller utilizing the adjustment data, an effective diameter of the first and second wheels relative to each other.

In addition to one or more aspects of the method, or as an alternate, the method includes adjusting, in operation by the controller, one or more of velocity and torque after an identified destination is reached, or after a predetermined period of time or operational runs is reached by the car mover.

In addition to one or more aspects of the method, or as an alternate, the method includes obtaining the adjustment data via a log of adjustments to the first and second wheel motors from prior runs of the car mover.

In addition to one or more aspects of the method, or as an alternate, the method includes one or more of: deriving the adjustment data as a weighted average applied to the log of adjustments to the first and second wheel motors from previous runs of the car mover; and deriving the adjustment data as a correction factor based on the log of adjustments to the first and second wheel motors from previous runs of the car mover.

In addition to one or more aspects of the method, or as an alternate, the method includes sensing, by a sensor operationally connected to the car mover, the first lateral clearance adjacent the first wheel on the track and the second lateral clearance adjacent the second wheel on the track.

In addition to one or more aspects of the method, or as an alternate, the method includes transmitting, by the sensor, sensor data indicative of the first and second lateral clearances to the controller via a wired or wireless transmission channel.

In addition to one or more aspects of the method, or as an alternate, the method includes transmitting, by the sensor, the sensor data to the controller over the wireless transmission channel, directly or via a cloud service.

In addition to one or more aspects of the method, or as an alternate, the method includes processing the sensor data, at least in part, by one more of the sensor via edge computing, the controller, and the cloud service.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIGS. 3B and 3C show opposing sides of the track beam;

DETAILED DESCRIPTION

Figure 1:
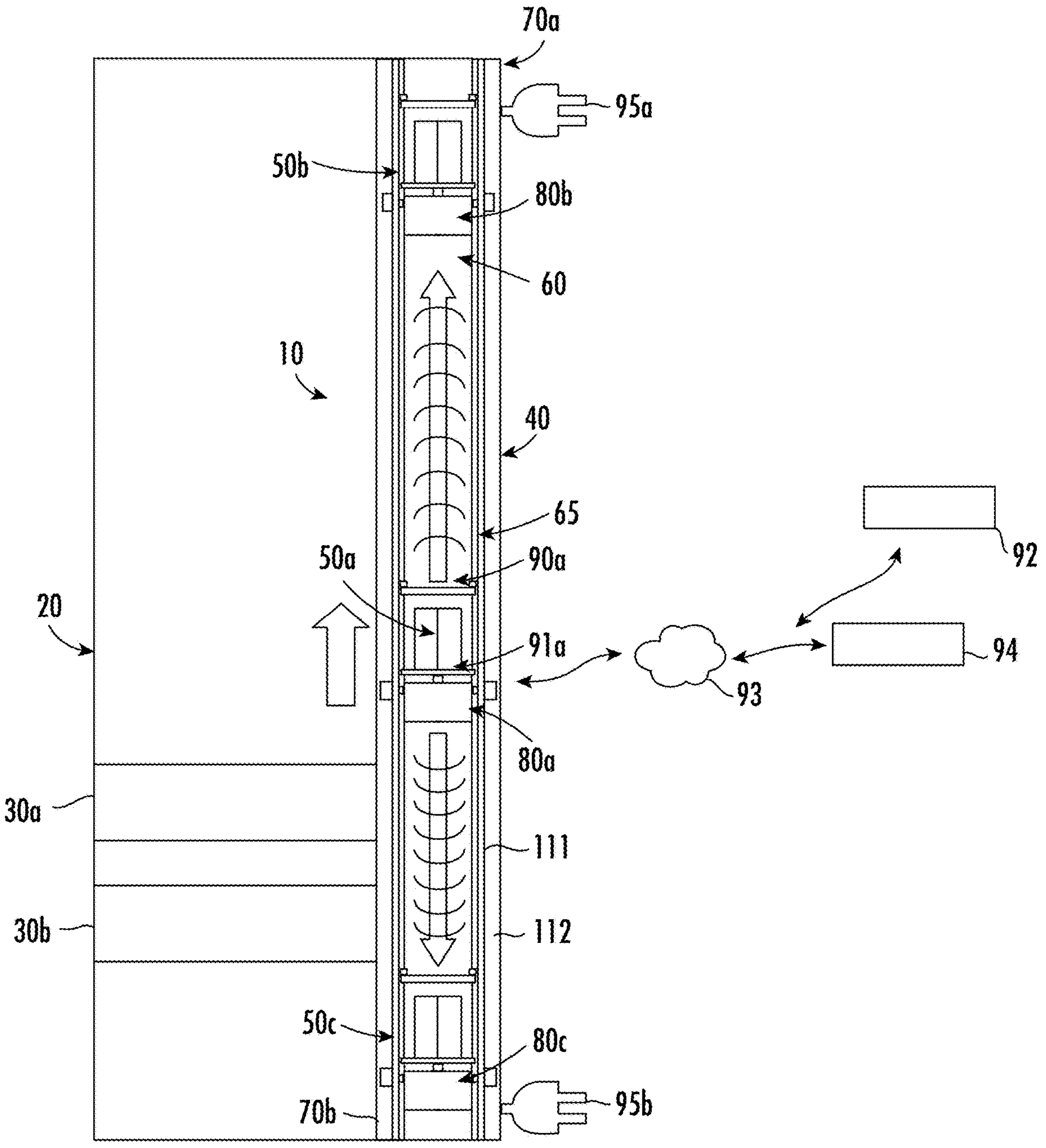
FIG. 1 is a schematic of elevator cars and car movers in a hoistway lane according to an embodiment.

FIG. 1 depicts a self-propelled or ropeless elevator system (elevator system) 10 in an exemplary embodiment that may be used in a structure or building 20 having multiple levels or floors 30*a*, 30*b*. Elevator system 10 includes a hoistway 40 (or elevator shaft) defined by boundaries carried by the building 20, and a plurality of cars 50*a*-50*c* adapted to travel in a hoistway lane 60 along an elevator car track 65 (which may be a T-rail) in any number of travel directions (e.g., up and down). The cars 50*a*-50*c* are generally the same so that reference herein shall be to the elevator car 50*a*. The hoistway 40 may also include a top end terminus 70*a* and a bottom end terminus 70*b*.

For each of the cars 50*a*-50*c*, the elevator system 10 includes one of a plurality of car mover systems (car movers) 80*a*-80*c* (otherwise referred to as a beam climber system, or beam climber, for reasons explained below). The car movers 80*a*-80*c* are generally the same so that reference herein shall be to the car 50*a*. The car mover 80*a* is configured to autonomously move along a car mover track beam 111*a* (otherwise referred to as a track beam or guide beam, and which may be an I-beam), and specifically along a car mover track surface 112 (otherwise referred to as a track) of the track beam 111. This operation moves the elevator car 50*a* along the hoistway lane 60. The car mover 80*a* may be positioned to engage the top 90*a* of the car 50*a*, the bottom 91*a* of the car 50*a*, or any other desired location. In FIG. 1, the car mover 80*a* engages the bottom 91*a* of the car 50*a*.

Though the car mover 80*a* operates autonomously, a supervisory hub 92 (also referred to as a supervisory controller) for the elevator system 10 may be included that may be configured with sufficient processors, discussed below, for communicating with a car mover controller 115 (FIG. 1, discussed below) of the car mover 80*a*. The supervisory controller 92 may provide a certain level of supervisory instructions, communicate notifications, alerts, relay information bidirectionally, etc. The supervisory controller 92 may communicate using wireless or wired transmission paths as identified below. Transmission channels may be direct or via a network 93, and may include a cloud service 94, as further discussed below. Data may be transmitted in raw form or may be processed in whole or part at any one of the car mover controller 115, the supervisory controller 92 or the cloud service 94, and such data may be stitched together or transmitted as separate packets.

The hoistway may have charging stations 95*a*, 95*b* for charging a power supply 120 (FIG. 2, discussed below) on board the car mover 80*a*. For example, one charging station 95*a* may be at a top end terminus 70*a* of the lane 60 of the hoistway 40 and another charging station 95*b* may be at a bottom end terminus 70*b*, or any other desired location.

Figure 2:
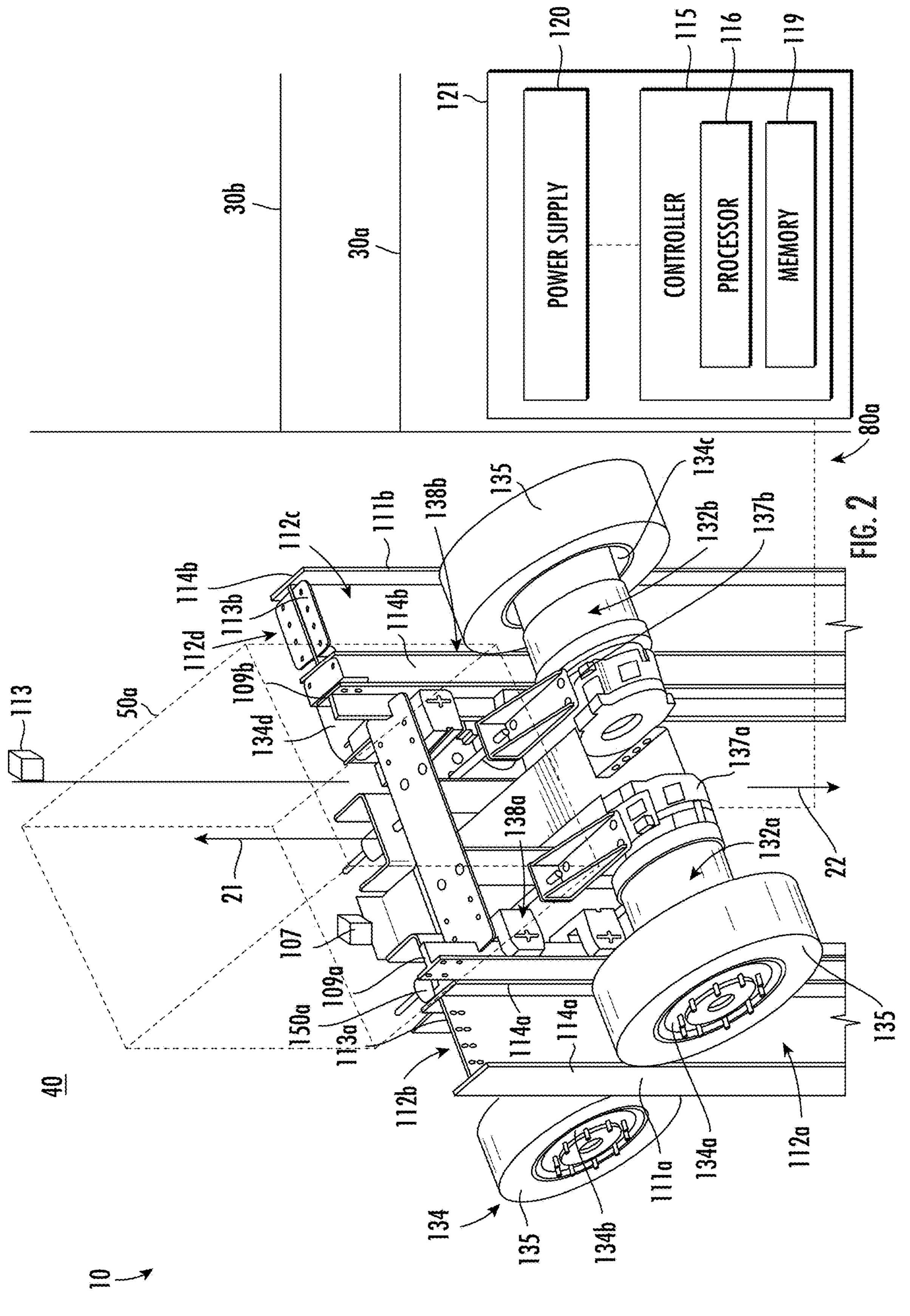
FIG. 2 shows a car mover according to an embodiment.

FIG. 2 is a perspective view of an elevator system 10 including the elevator car 50*a*, a car mover 80*a*, a controller 115, and a power source 120. Although illustrated in FIG. 1 as separate from the car mover 80*a*, the embodiments described herein may be applicable to a controller 115 included in the car mover 80*a* (i.e., moving through an hoistway 40 with the car mover 80*a*) and may also be applicable a controller located off of the car mover 80*a* (i.e., remotely connected to the car mover 80*a* and stationary relative to the car mover 80*a*).

Although illustrated in FIG. 1 as separate from the car mover 80*a*, the embodiments described herein may be applicable to a power source 120 included in the car mover 80*a* (i.e., moving through the hoistway 40 with the car mover 80*a*) and may also be applicable to a power source located off of the car mover 80*a* (i.e., remotely connected to the car mover 80*a* and stationary relative to the car mover 80*a*).

The car mover 80*a* is configured to move the elevator car 50*a* within the hoistway 40 and along guide rails 109*a*, 109*b* that extend vertically through the hoistway 40. In an embodiment, the guide rails 109*a*, 109*b* are T-beams. The car mover 80*a* includes one or more electric motors 132*a*, 132*b*. The electric motors 132*a*, 132*b* are configured to move the car mover 80*a* within the hoistway 40 by rotating one or more motorized wheels 134*a*, 134*b*, 134*c*, 134*d* that are, in pairs (first pair 134*a*, 134*b*, and second pair 134*c*, 134*d*) pressed against respective guide beams 111*a*, 111*b*, e.g., together forming the car mover track beam 111 (FIG. 1). In an embodiment, the guide beams 111*a*, 111*b* are I-beams. It is understood that while an I-beam is illustrated any beam or similar structure may be utilized with the embodiment described herein. Friction between the wheels

134*a*, 134*b*, 134*c*, 134*d* driven by the electric motors 132*a*, 132*b* allows the wheels 134*a*, 134*b*, 134*c*, 134*d* climb up 21 and down 22 the guide beams 111*a*, 111*b*. The guide beam extends vertically through the hoistway 40. It is understood that while two guide beams 111*a*, 111*b* are illustrated, the embodiments disclosed herein may be utilized with one or more guide beams. It is also understood that while two electric motors 132*a*, 132*b* are illustrated, the embodiments disclosed herein may be applicable to car movers 80*a* having one or more electric motors. For example, the car mover 80*a* may have one electric motor for each of the four wheels 134*a*, 134*b*, 134*c*, 134*d* (generically wheels 134). The electrical motors 132*a*, 132*b* may be permanent magnet electrical motors, asynchronous motor, or any electrical motor known to one of skill in the art. In other embodiments, not illustrated herein, another configuration could have the powered wheels at two different vertical locations (i.e., at bottom and top of an elevator car 50*a*).

The first guide beam 111*a* includes a web portion 113*a* and two flange portions 114*a*. The web portion 113*a* of the first guide beam 111*a* includes a first surface 112*a* and a second surface 112*b* opposite the first surface 112*a*. A first wheel 134*a* is in contact with the first surface 112*a* and a second wheel 134*b* is in contact with the second surface 112*b*. The first wheel 134*a* may be in contact with the first surface 112*a* through a tire 135 and the second wheel 134*b* may be in contact with the second surface 112*b* through a tire 135. The first wheel 134*a* is compressed against the first surface 112*a* of the first guide beam 111*a* by a first compression mechanism 150*a* and the second wheel 134*b* is compressed against the second surface 112*b* of the first guide beam 111*a* by the first compression mechanism 150*a*. The first compression mechanism 150*a* compresses the first wheel 134*a* and the second wheel 134*b* together to clamp onto, or pinch against, the web portion 113*a* of the first guide beam 111*a*.

The first compression mechanism 150*a* may be a metallic or elastomeric spring mechanism, a pneumatic mechanism, a hydraulic mechanism, a turnbuckle mechanism, an electromechanical actuator mechanism, a spring system, a hydraulic cylinder, a motorized spring setup, or any other known force actuation method.

The first compression mechanism 150*a* may be adjustable in real-time during operation of the elevator system 10 to control compression of the first wheel 134*a* and the second wheel 134*b* on the first guide beam 111*a*. The first wheel 134*a* and the second wheel 134*b* may each include a tire 135 to increase traction with the first guide beam 111*a*.

The first surface 112*a* and the second surface 112*b* extend vertically through the hoistway 40, thus creating the track surface 112 for the first wheel 134*a* and the second wheel 134*b* to ride on. The flange portions 114*a*, which may be referred to as track beam sidewalls, may work as guardrails to help guide the wheels 134*a*, 134*b* along this track surface and thus help prevent the wheels 134*a*, 134*b* from running off track surface.

The first electric motor 132*a* is configured to rotate the first wheel 134*a* to climb up 21 or down 22 the first guide beam 111*a*. The first electric motor 132*a* may also include a first motor brake 137*a* to slow and stop rotation of the first electric motor 132*a*.

The first motor brake 137*a* may be mechanically connected to the first electric motor 132*a*. The first motor brake 137*a* may be a clutch system, a disc brake system, a drum brake system, a brake on a rotor of the first electric motor 132*a*, an electronic braking, an Eddy current brakes, a Magnetorheological fluid brake or any other known braking system. The beam climber system 130 may also include a first guide rail brake 138*a* operably connected to the first guide rail 109*a*. The first guide rail brake 138*a* is configured to slow movement of the beam climber system 130 by clamping onto the first guide rail 109*a*. The first guide rail brake 138*a* may be a caliper brake acting on the first guide rail 109*a* on the beam climber system 130, or caliper brakes acting on the first guide rail 109 proximate the elevator car 50*a*.

The second guide beam 111*b* includes a web portion 113*b* and two flange portions 114*b*. The web portion 113*b* of the second guide beam 111*b* includes a first surface 112*c* and a second surface 112*d* opposite the first surface 112*c*. A third wheel 134*c* is in contact with the first surface 112*c* and a fourth wheel 134*d* is in contact with the second surface 112*d*. The third wheel 134*c* may be in contact with the first surface 112*c* through a tire 135 and the fourth wheel 134*d* may be in contact with the second surface 112*d* through a tire 135. A third wheel 134*c* is compressed against the first surface 112*c* of the second guide beam 111*b* by a second compression mechanism 150*b* and a fourth wheel 134*d* is compressed against the second surface 112*d* of the second guide beam 111*b* by the second compression mechanism 150*b*. The second compression mechanism 150*b* compresses the third wheel 134*c* and the fourth wheel 134*d* together to clamp onto the web portion 113*b* of the second guide beam 111*b*.

The second compression mechanism 150*b* may be a spring mechanism, turnbuckle mechanism, an actuator mechanism, a spring system, a hydraulic cylinder, and/or a motorized spring setup. The second compression mechanism 150*b* may be adjustable in real-time during operation of the elevator system 10 to control compression of the third wheel 134*c* and the fourth wheel 134*d* on the second guide beam 111*b*. The third wheel 134*c* and the fourth wheel 134*d* may each include a tire 135 to increase traction with the second guide beam 111*b*.

The first surface 112*c* and the second surface 112*d* extend vertically through the shaft 117, thus creating a track surface for the third wheel 134*c* and the fourth wheel 134*d* to ride on. The flange portions 114*b* may work as guardrails to help guide the wheels 134*c*, 134*d* along this track surface and thus help prevent the wheels 134*c*, 134*d* from running off track surface.

The second electric motor (otherwise referred to as a wheel drive motor or wheel motor) 132*b* is configured to rotate the third wheel 134*c* to climb up 21 or down 22 the second guide beam 111*b*. The second electric motor 132*b* may also include a second motor brake 137*b* to slow and stop rotation of the second motor 132*b*. The second motor brake 137*b* may be mechanically connected to the second motor 132*b*. The second motor brake 137*b* may be a clutch system, a disc brake system, drum brake system, a brake on a rotor of the second electric motor 132*b*, an electronic braking, an Eddy current brake, a Magnetorheological fluid brake, or any other known braking system. The beam climber system 130 includes a second guide rail brake 138*b* operably connected to the second guide rail 109*b*. The second guide rail brake 138*b* is configured to slow movement of the beam climber system 130 by clamping onto the second guide rail 109*b*. The second guide rail brake 138*b* may be a caliper brake acting on the first guide rail 109*a* on the beam climber system 130, or caliper brakes acting on the first guide rail 109*a* proximate the elevator car 50*a*.

The elevator system 10 may also include a position reference system (PRS) 113. The position reference system 113 may be mounted on a fixed part at the top of the hoistway 40, such as on a support or guide rail 109, and may be configured to provide position signals related to a position of the elevator car 50*a* within the hoistway 40. In other embodiments, the position reference system 113 may be directly mounted to a moving component of the elevator system (e.g., the elevator car 50*a* or the car mover 80*a*), or may be located in other positions and/or configurations.

The position reference system 113 can be any device or mechanism for monitoring a position of an elevator car within the elevator shaft 117. For example, without limitation, the position reference system 113 can be an encoder, sensor, accelerometer, altimeter, pressure sensor, range finder, or other system and can include velocity sensing, absolute position sensing, etc., as will be appreciated by those of skill in the art. The position reference system 113 may communicate with the car mover controller 115 wirelessly or via a wired transmission, using protocols identified herein. Wireless transmission may be direct or via network 93 (FIG. 1) and may include transmissions through a cloud service 94 (FIG. 1). Data from the position reference system 113 may be sent in raw form or may be compiled in whole or part at any one of the position reference system 113, via edge computing, or at the car mover controller 115 or cloud service 94, and portions of the data in any such form may be stitched together or transmitted as separate packets of information.

The controller 115 may be an electronic controller including a processor 116 and an associated memory 119 comprising computer-executable instructions that, when executed by the processor 116, cause the processor 116 to perform various operations. The processor 116 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 119 may be but is not limited to a random access memory (RAM), read only memory (ROM), or other electronic, optical, magnetic or any other computer readable medium.

The controller 115 is configured to control the operation of the elevator car 50*a* and the car mover 80*a*. For example, the controller 115 may provide drive signals to the car mover 80*a* to control the acceleration, deceleration, leveling, stopping, etc. of the elevator car 50*a*.

The controller 115 may also be configured to receive position signals from the position reference system 113 or any other desired position reference device. The data transmitted between the controller 115 and position reference system 113 may be obtained and processed separately and stitched together, or processed at one of the two components, and may be processed in a raw or complied form.

When moving up 21 or down 22 within the hoistway 40 along the guide rails 109*a*, 109*b*, the elevator car 50*a* may stop at one or more floors 30*a*, 30*b* as controlled by the controller 115. In one embodiment, the controller 115 may be located remotely or in the cloud. In another embodiment, the controller 115 may be located on the car mover 80*a*

The power supply 120 for the elevator system 10 may be any power source, including a power grid and/or battery power which, in combination with other components, is supplied to the car mover 80*a*. In one embodiment, power source 120 may be located on the car mover 80*a*. In an embodiment, the power supply 120 is a battery that is included in the car mover 80*a*. The elevator system 10 may also include an accelerometer 107 attached to the elevator car 50*a* or the car mover 80*a*. The accelerometer 107 is configured to detect an acceleration and/or a speed of the elevator car 50*a* and the car mover 80*a*.

Figures 3A, 3B, 3C:
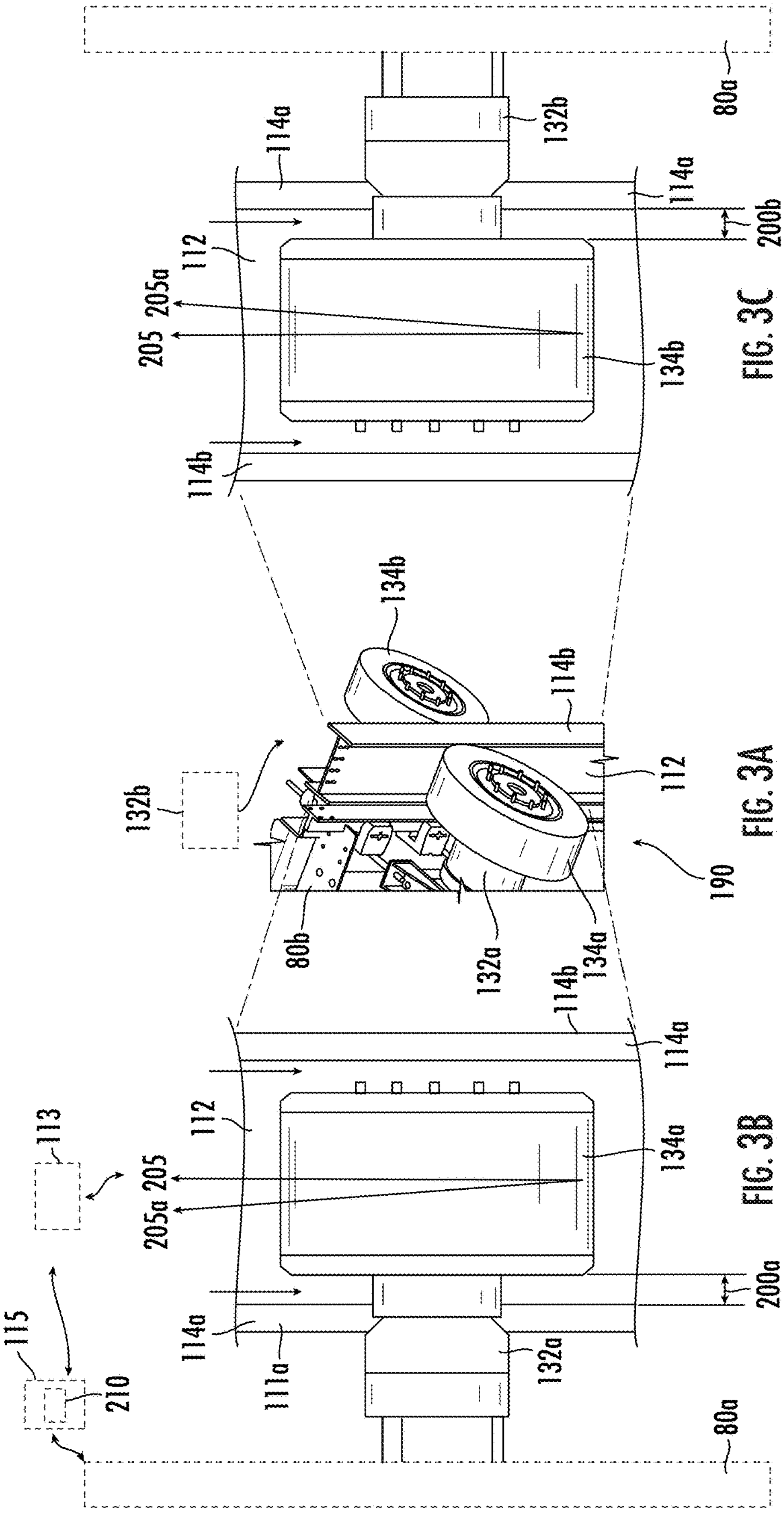
FIGS. 3A-3C show a portion of the car mover equipped with a lateral clearance control self-learning module according to an embodiment, where

Turning to FIGS. 3A-3C, the above disclosed ropeless elevator system 10 uses the car mover 80*a* as a beam climber, only a portion of which is shown in FIGS. 3A-3C. The discussion of the portion of the car mover 80*a* in FIGS. 3A-3C shall apply to the entire car mover 80*a*. For example, the discussion applied herein to the wheels 134*a*, 13*b*, and the interaction between these two wheels and the track beam 111*a* (the first track beam), applies equally wheels 134*c*, 134*d* and the interaction between those two wheels and the track beam 111*b* (the second track beam). The wheels 134*a*, 134*b* should steer along the track surface 112 of the track beam 111*a* with relatively small running clearances, e.g., lateral clearances 200*a*, 200*b* (otherwise referred to as lateral clearance), between the respective wheel 134*a*, 134*b* and the lateral sidewall 114*a*. In addition, the same lateral clearance should be maintained on both lateral side of each of the wheels 134*a*, 134*b*. Non-limiting examples of clearances 200*a*, 200*b* include twenty millimeters (+/−20 mm) with application speeds of, for example, six miles per hour (6 mph).

If the wheels 134*a*, 134*b* have different diameters, e.g., due to uneven wear, applying the same rotational speed to both may result in an uneven motion. Instead of a straight path 205, a skewed path 205*a* may result. This can be measured by lateral clearances 200*a*, 200*b* that differ from each other and/or are outside of a predetermined tolerance. Due to the uncertainty in the effective wheel radii during any run, a controller, which may be the car mover controller 115, utilizing adjustment data from prior runs and sensor data representing the size of the lateral clearances 200*a*, 200*b*, may actively control one or more aspects of the wheels 134*a*, 134*b* such as the velocity and torque, to provide a same effective diameter.

Figure 4A:
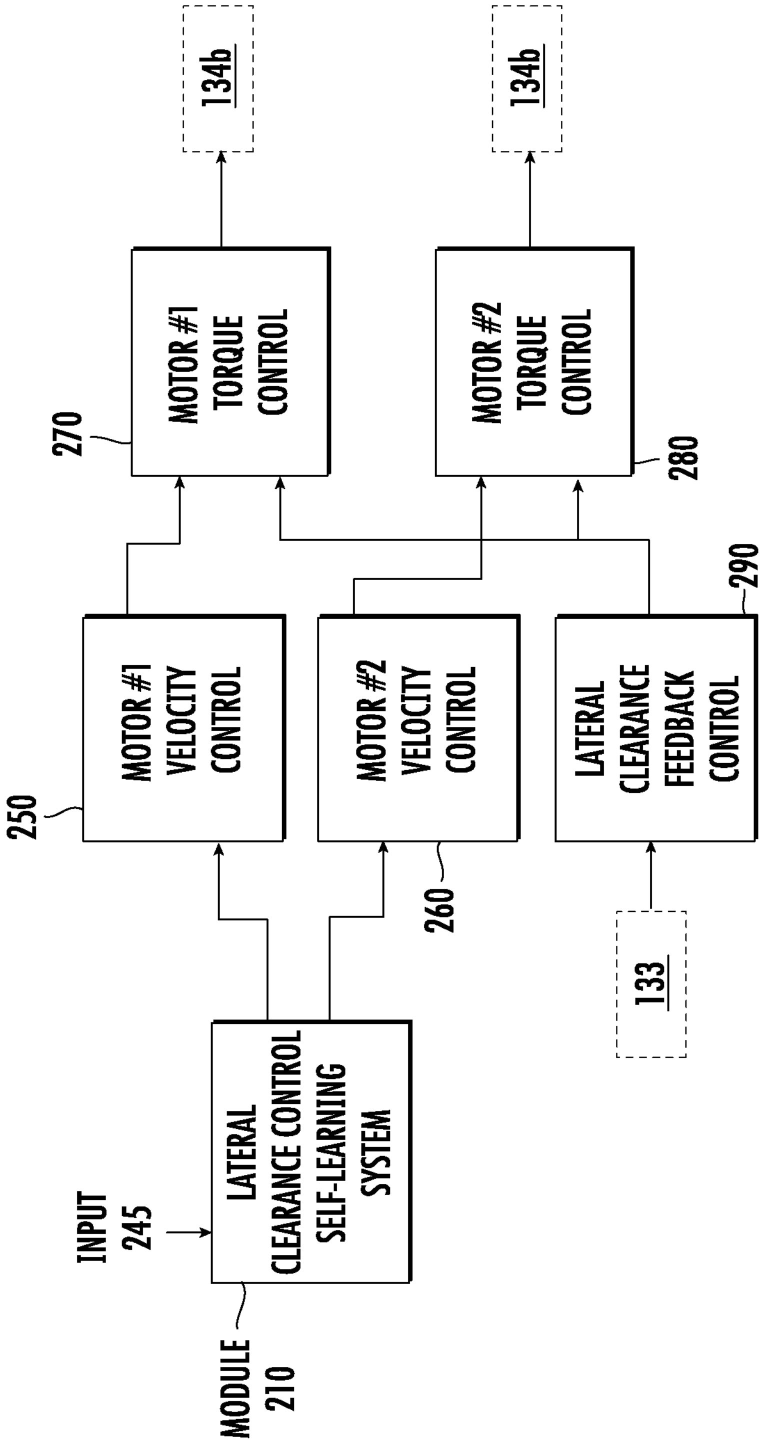
FIG. 4A is a process diagram for execution of the lateral clearance control self-learning module according to an embodiment.

More specifically, turning to FIG. 4A, the car mover controller 115, when executing the lateral clearance control self learning module 210, receives input data 245 that is adjustment data based on previous adjustments to the wheel motors 132*a*, 132*b* from previous runs of the car mover 80*a*. The car mover controller 115 processes the input and is configured transmit its output as commands to adjust rotational speed of the wheel, thereby adjusting its velocity on the track, via velocity adjustment commands 250, 260, or apply torque, via torque adjustment commands 270, 280, to one or more of the wheel motors 132*a*, 132*b*. These adjustment commands augment the adjustment data fed as input 245 to the lateral clearance control self-learning module 210. The processing of the input data 245 may be, for example, by applying a correction factor to the data logged from previous runs, or by weighting the data. That is, the controller 115, executing the lateral clearance-control self learning module 210, sends velocity adjustment commands to the motors 132*a*, 132*b*. These adjustments are the self-learned outputs of the controller 115.

Figure 4B:
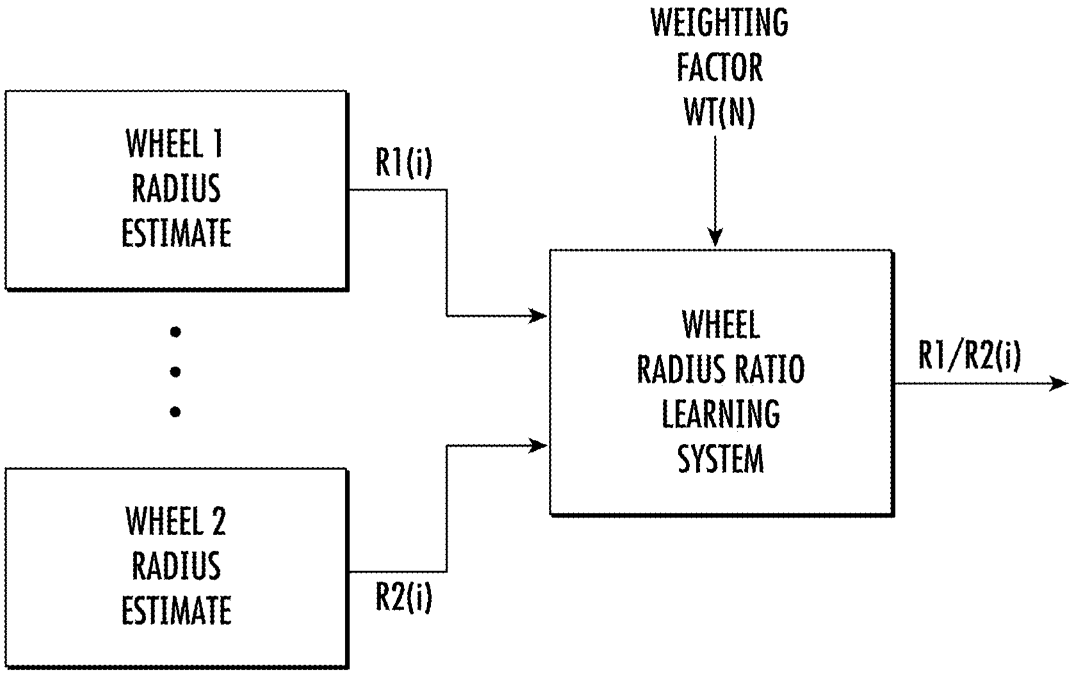
FIG. 4B shows a process diagram for a controller, executing the lateral clearance control self-learning module, calculating a radius ratio for controlled wheels over a series of elevator runs based on a weighting factor according to an embodiment.

More specifically, as shown in FIG. 4B, after each run (e.g., run (i)) a ratio, calculated by the controller 115 executing the self-learning module 210, of the travel distance and the rotations of the wheel in question (e.g., wheel 134*a*) gives an estimate of the effective wheel radius for that run. This estimate is obtained for all the wheels in the system which are being controlled (e.g. two wheels (including wheels 134*a*/134*b*) or four wheels (further including 134*c*/134*d*)).

The controller 115, further utilizing the self-learning module 210, applies the estimate of the effective wheel radius for that run (i) and computes the ratio of the wheel radii for that individual run (i) and saves it into memory. A weighted summation of the current run and N−1 prior runs is computed, e.g., according to the following sample formulas:

$$R1(i) = D1(i)/n1(i) \quad \text{Formula 1}$$

$$R2/R1(i) = \sum_{j=0}^{N-1} \text{wt}(j+1)\frac{R2(i-j)}{R1(i-j)} \quad \text{Formula 2}$$

For Formula 1, Radius=(Linear distance traveled by car (m))/(rotations of the wheel (e.g. 134*a*) in radians). For formula 2, the updated calculated radius ratio is a weighted sum of past estimated radii ratio values. Wt(i) may be a strict average, or it may be weighted where wt(i) does not necessarily equal wt(i+1). The selection of the weighting function, wt(N), for the self-learning module 210 may be driven by various goals. For example, the function should filter out noise from run to run variations in the calculated radius (e.g., tire radius) estimates. The function should also track changes in the radius ratios in a relatively timely manner. The filtering requirement may be accomplished by ensuring that the weighting function includes a large enough set of past readings. The dynamic tracking performance can be accomplished by ensuring the weighting function adequately weighs the most recent estimates to respond to quickly changing conditions.

Figure 4C:
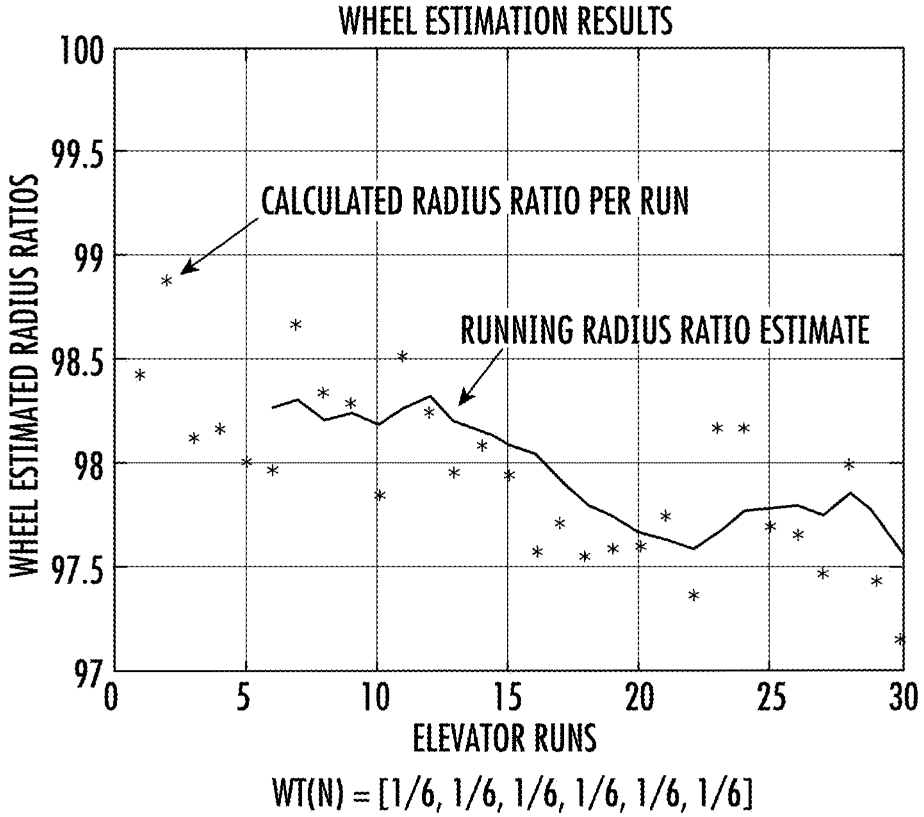
FIG. 4C shows convergence of estimated radius ratios and calculated radius ratios for controlled wheels over a series of elevator runs according to an embodiment.

FIG. 4C shows sample calculated results from the controller 115 executing the self-learning module 210 to calculate to radius ratios (Formula 2) per run. The asterisks represent the individual radii ratios for each specific run calculated by the controller 115. The solid line curve represents the estimated radius ratios. As shown, the data smooths out due to the weighting (averaging) factor.

In addition, the car mover controller 115 may execute a lateral clearance feedback control module 290 on sensor data from the sensor 113. The output of the lateral clearance feedback control module 290 is also utilized to generate the torque adjustment commands 270, 280, to apply torque to one or more of the wheel motors 132*a*, 132*b*. These adjustment commands further augment the adjustment data fed as input 245 to the lateral clearance control self-learning module 210.

Figure 5A:
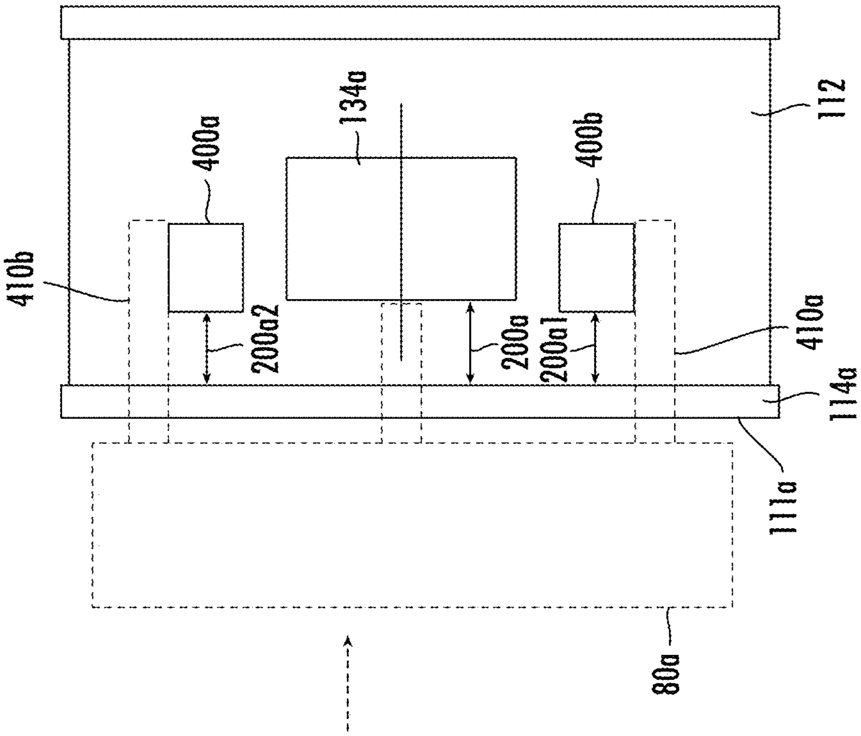
FIG. 5A shows an embodiment utilizing a plurality of sensors that enable the system to monitor both tilt of the car mover to provide for lateral clearance control self-learning according to an embodiment.

Turning to FIG. 5A, in an embodiment, a plurality of sensors 400*a*, 400*b* may be operationally connected to the car mover 80*a*. One of the sensors 400*a*, 400*b* may be the sensor 113 or both of the sensors 400*a*, 400*b* may be additional sensors that obtain data and communicate via wired or wireless transmission channels with the controller 115 as indicated herein. Both sensors 400*a*, 400*b* may be, together, on the left or right (first or second) lateral aides of the car mover 80*a*. The sensors 400*a*, 400*b* may be vertically spaced apart from each other, e.g., along an axis parallel to the length (longitudinal axis, normal to the lateral axis) of the track beam 111*a*, affixed to the car mover 80*a* directly or to one or more respective brackets 410*a*, 410*b*. The same configuration may be applied to both sides of the track beam 111*a*, for both wheels 134*a*, 134*b*.

For each wheel 134*a*, 134*b*, sensor data, representing respective distances 200*a*1, 200*a*2 (or lateral clearances, or gaps) to the sidewall 111*a*, may indicate a tilt (or angle) of the wheel 134*a* relative to the direction of travel 205. An average of the data from two sensors 400*a*, 400*b*, may represent the lateral clearance 200*a*. In one embodiment one of the sensors 400*a*, 400*b* is a lateral clearance sensor while the other is tilt sensor (e.g., inclinometer).

Figure 5B:
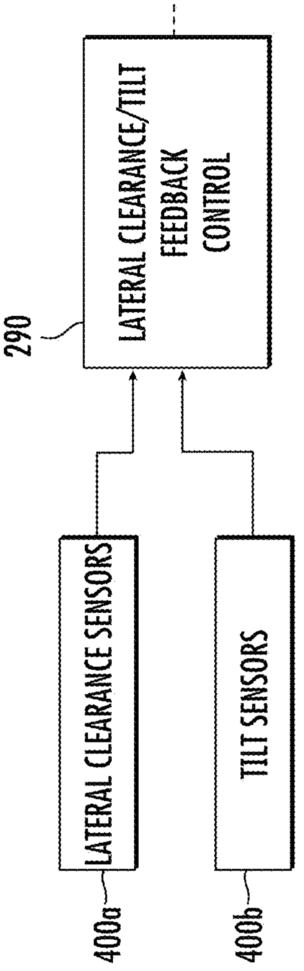
FIG. 5B shows a process map for utilizing a plurality of sensors that enable the system to monitor both tilt of the car mover to provide for lateral clearance control self-learning according to an embodiment.

FIG. 5B shows a process map for utilizing the data from the sensors 400*a*, 400*b* by the controller 115, where one of the sensors 400*a* is the lateral clearance sensor (and which may be the same as sensor 113) and one 400*b* is a tilt sensor. Again, this operation applies to both sides of the track beam 111*a*, i.e., for both wheels 134*a*, 134*b*. Data from the lateral clearance sensor 400*a* and tilt sensor 400*b* may be fed to the controller 115 executing the feedback control module 290 (FIG. 4). Processing thereafter is the same as that described in FIG. 4, above. Thus, the lateral clearance control self-learning module 210 accounts for both the lateral clearance and tilt of the wheels 134*a*, 134*b* when adjusting motor parameters to provide corrective measures to the wheels 134*a*, 134*b*.

The above identified velocity adjustment commands may result in adjustments to the rotational speed of one wheel as compared with the other. The end state of the self-learning adjustments, if operating as intended according to an embodiment, result in the adjusted diameters matching the actual diameters of the tires. The torque adjustment commands may result in aligning of a wheel that may have come out of alignment. Adjustments may be made after the destination is reached, after one or more sets of runs, periodically, or dynamically during a run utilizing the position reference system. The result is a dampening out of unwanted motion for the wheels by continuous dynamic optimization of motor torque parameters.

Figure 6A:
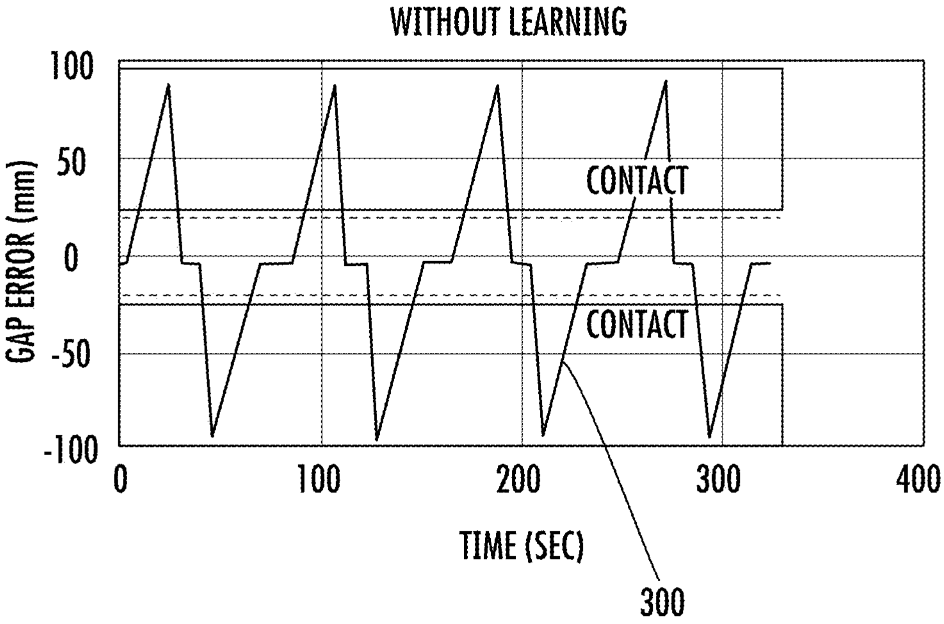
FIG. 6A shows a response of car mover without applying the lateral clearance control self-learning module.
Figure 6B:
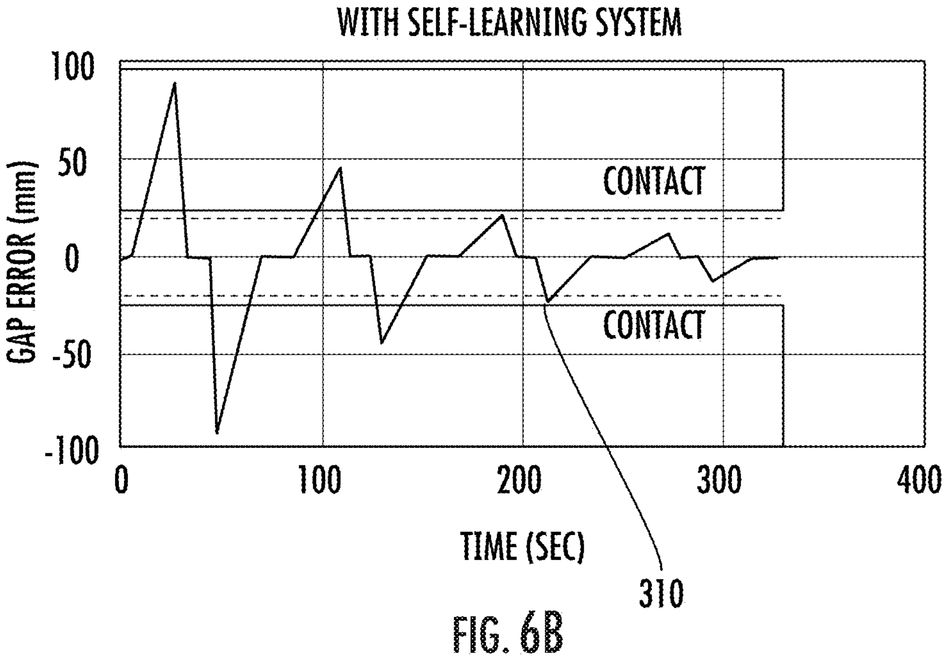
FIG. 6B shows a response of car mover when applying the lateral clearance control self-learning module according to an embodiment.

FIGS. 6A and 6B show a simulation of a predicted performance for a car mover 80*a* operating at six miles per hour along a one hundred and fifty meter track (6 mps, 150 m) system for a series of four (4) up/down runs, assuming a three tenths of a percent (0.3%) wheel radius error and a three Hertz (3 Hz) bandwidth applied by the car mover controller 115 when executing the lateral clearance feedback control module 290. Without the execution of the lateral clearance control self-learning module 210, a lateral clearance error 300 (FIG. 5A) exceeds a desired (+/−20 mm) twenty millimeter tolerance. With execution of the lateral clearance control self-learning module 210 (FIG. 6B) implemented adjustments reduce the lateral clearance error to levels after three (3) runs as the true estimates of the tire radii of the wheels 134*a*, 134*b* are adjusted and learned after a few repeated elevator runs.

Figure 7:
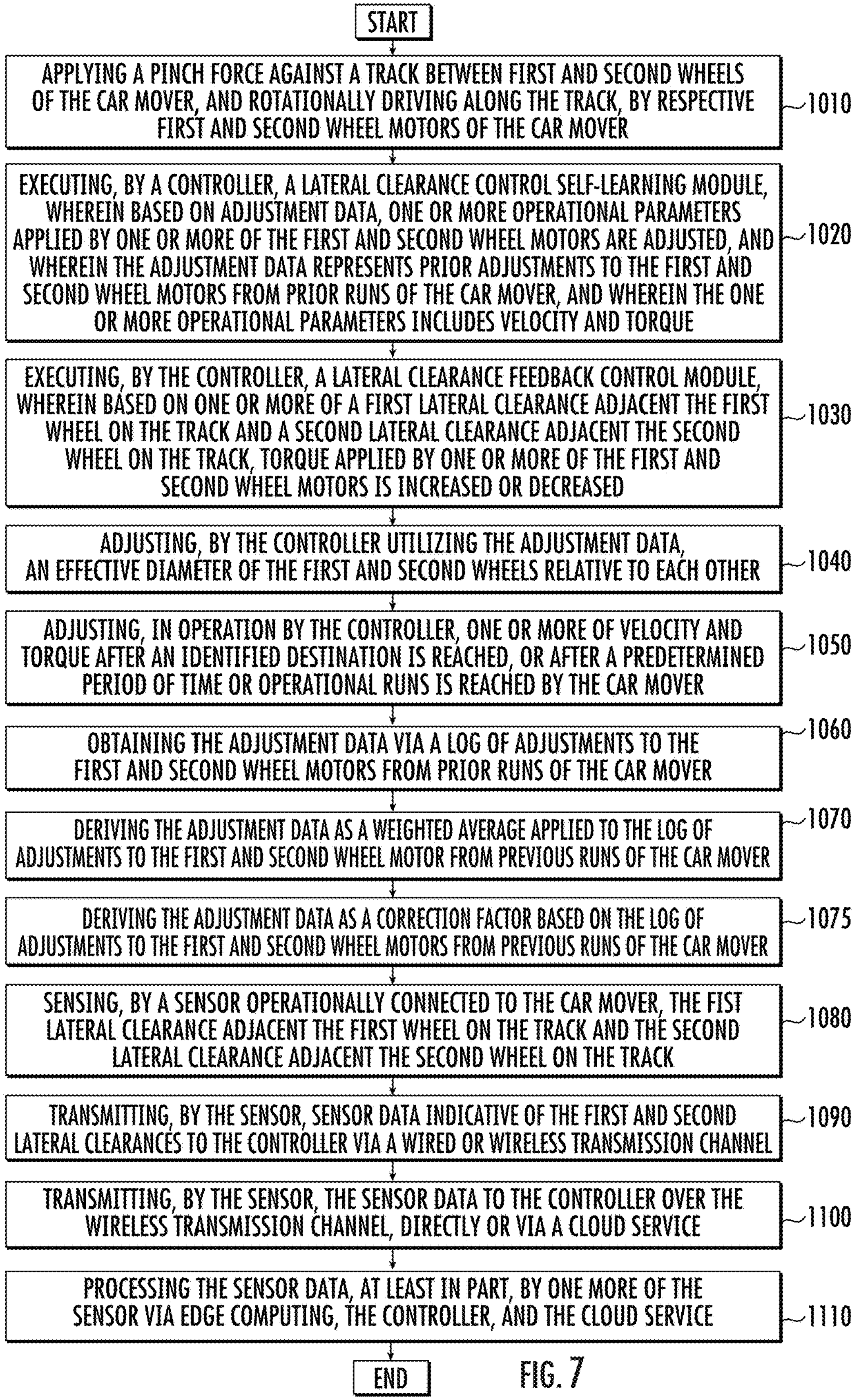
FIG. 7 is a flow chart showing an operation of a car mover that utilizes the lateral clearance control self-learning module according to an embodiment.

Turning to FIG. 7, a flowchart shows a method of operating a car mover 80*a* for autonomously moving an elevator car 50*a* along a lane 60 in a hoistway 40. As shown in block 1010, the method includes applying a pinch force against a track 112 between first and second wheels 134*a*, 134*b* of the car mover 80*a*, and rotationally driving along the track 112, by respective first and second wheel motors 132*a*, 132*b* of the car mover 80*a*. As shown in block 1020, the method includes executing, by a controller 115, a lateral clearance control self-learning module 210. From this operation, based on adjustment data (the input 245), one or more operational parameters applied by one or more of the first and second wheel motors 132*a*, 132*b* are adjusted. Furthermore, the adjustment data may represent prior adjustments to the first and second wheel motors 132*a*, 132*b* from prior runs of the car mover 80*a*. Moreover, the one or more operational parameters may include one or both of velocity and torque.

As shown in block 1030, the method includes executing, by the controller 115, a lateral clearance feedback control module 290. From this operation, based on one or more of a first lateral clearance 200*a* adjacent the first wheel 134*a* on the track 112 and a second lateral clearance 200*b* adjacent the second wheel 134*b* on the track 112, torque applied by one or more of the first and second wheel motors 132*a*, 132*b* is increased or decreased. As shown in block 1040, the method adjusting, by the controller 115 utilizing the adjustment data, an effective diameter of the first and second wheels 134*a*, 134*b* relative to each other. As shown in block 1050, the method includes adjusting, in operation, one or more of velocity and torque after an identified destination is reached, or after a predetermined period of time or operational runs is reached by the car mover 80*a*.

As shown in block 1060, the method includes obtaining the adjustment data via a log of adjustments to the first and second wheel motors 132*a*, 132*b* from prior runs of the car mover 80*a*. As shown in block 1070, the method includes deriving the adjustment data as a weighted average applied to the log of adjustments to the first and second wheel motors 132*a*, 132*b* from previous runs of the car mover 80*a*. As shown in block 1075, the method includes deriving the adjustment data as a correction factor based on the log of adjustments to the first and second wheel motors from previous runs of the car mover 80*a*.

As shown in block 1080, the method includes sensing, by a sensor 113 operationally connected to the car mover 80*a*, the first lateral clearance 200*a* adjacent the first wheel 134*a* on the track 112 and the second lateral clearance 200*b* adjacent the second wheel 134*b* on the track 112. As shown in block 1090, the method includes transmitting, by the sensor 113, sensor data indicative of the first and second lateral clearances 200*a*, 200*b* to the controller 115 via a wired or wireless transmission channel. As shown in block 1100, the method includes transmitting, by the sensor 113, the sensor data to the controller 115 over the wireless transmission channel, directly or via a cloud service 94. As shown in block 1110, the method includes processing the sensor data, at least in part, by one more of the sensor 113 via edge computing, the controller 115, and the cloud service 94.

The above embodiments utilize data from prior runs to control the operation of the wheels 134*a*, 134*b*. In an alternate embodiment, rather than relying on data from prior runs, the controller 115 may control the operation of the wheels 134*a*, 134*b* dynamically, e.g., without any reliance on previous runs. For example, the controller 115 may rely on the lateral clearance feedback control module 290 to rely on sensor data for controlling the operation of the wheels 134*a*, 134*b*.

Wireless connections identified above may apply protocols that include local area network (LAN, or WLAN for wireless LAN) protocols and/or a private area network (PAN) protocols. LAN protocols include WiFi technology, based on the Section 802.11 standards from the Institute of Electrical and Electronics Engineers (IEEE). PAN protocols include, for example, Bluetooth Low Energy (BTLE), which is a wireless technology standard designed and marketed by the Bluetooth Special Interest Group (SIG) for exchanging data over short distances using short-wavelength radio waves. PAN protocols also include Zigbee, a technology based on Section 802.15.4 protocols from the IEEE, representing a suite of high-level communication protocols used to create personal area networks with small, low-power digital radios for low-power low-bandwidth needs. Such protocols also include Z-Wave, which is a wireless communications protocol supported by the Z-Wave Alliance that uses a mesh network, applying low-energy radio waves to communicate between devices such as appliances, allowing for wireless control of the same.

Other applicable protocols include Low Power WAN (LPWAN), which is a wireless wide area network (WAN) designed to allow long-range communications at a low bit rates, to enable end devices to operate for extended periods of time (years) using battery power. Long Range WAN (LoRaWAN) is one type of LPWAN maintained by the LoRa Alliance, and is a media access control (MAC) layer protocol for transferring management and application messages between a network server and application server, respectively. Such wireless connections may also include radio-frequency identification (RFID) technology, used for communicating with an integrated chip (IC), e.g., on an RFID smartcard. In addition, Sub-1 Ghz RF equipment operates in the ISM (industrial, scientific and medical) spectrum bands below Sub 1 Ghz-typically in the 769-935 MHZ, 315 Mhz and the 468 Mhz frequency range. This spectrum band below 1 Ghz is particularly useful for RF IoT (internet of things) applications. Other LPWAN-IoT technologies include narrowband internet of things (NB-IoT) and Category M1 internet of things (Cat M1-IoT). Wireless communications for the disclosed systems may include cellular, e.g. 2G/3G/4G (etc.). The above is not intended on limiting the scope of applicable wireless technologies.

Wired connections identified above may include connections (cables/interfaces) under RS (recommended standard)-422, also known as the TIA/EIA-422, which is a technical standard supported by the Telecommunications Industry Association (TIA) and which originated by the Electronic Industries Alliance (EIA) that specifies electrical characteristics of a digital signaling circuit. Wired connections may also include (cables/interfaces) under the RS-232 standard for serial communication transmission of data, which formally defines signals connecting between a DTE (data terminal equipment) such as a computer terminal, and a DCE (data circuit-terminating equipment or data communication equipment), such as a modem. Wired connections may also include connections (cables/interfaces) under the Modbus serial communications protocol, managed by the Modbus Organization. Modbus is a master/slave protocol designed for use with its programmable logic controllers (PLCs) and which is a commonly available means of connecting industrial electronic devices. Wireless connections may also include connectors (cables/interfaces) under the PROFibus (Process Field Bus) standard managed by PROFIBUS & PROFINET International (PI). PROFibus which is a standard for fieldbus communication in automation technology, openly published as part of IEC (International Electrotechnical Commission) 61158. Wired communications may also be over a Controller Area Network (CAN) bus. A CAN is a vehicle bus standard that allow microcontrollers and devices to communicate with each other in applications without a host computer. CAN is a message-based protocol released by the International Organization for Standards (ISO). The above is not intended on limiting the scope of applicable wired technologies.

As indicated, when data is transmitted over a network between end processors, the data may be transmitted in raw form or may be processed in whole or part at any one of the end processors or an intermediate processor, e.g., at a cloud service or other processor. The data may be parsed at any one of the processors, partially or completely processed or complied, and may then be stitched together or maintained as separate packets of information.

Each processor identified herein may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory identified herein may be but is not limited to a random access memory (RAM), read only memory (ROM), or other electronic, optical, magnetic or any other computer readable medium. Embodiments can be in the form of processor-implemented processes and devices for practicing those processes, such as processor. Embodiments can also be in the form of computer code based modules, e.g., computer program code (e.g., computer program product) containing instructions embodied in tangible media (e.g., non-transitory computer readable medium), such as floppy diskettes, CD ROMs, hard drives, on processor registers as firmware, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the exemplary embodiments. When implemented on a general-purpose microprocessor, the computer program code segments configure the microprocessor to create specific logic circuits.

The terminology used herein is for the purpose of describing particular embodiments only and is not intended to be limiting of the present disclosure. The term "about" is intended to include the degree of error associated with measurement of the particular quantity and/or manufacturing tolerances based upon the equipment available at the time of filing the application. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, subcombinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A car mover for autonomously moving an elevator car along a lane in a hoistway, comprising:

first and second wheels of the car mover, configured to apply a pinch force against a track therebetween and to rotationally drive along the track, by respective first and second wheel motors of the car mover; and a controller configured to execute:

a lateral clearance control self-learning module, wherein based on adjustment data, one or more operational parameters applied by one or more of the first and second wheel motors are adjusted; and a lateral clearance feedback control module, wherein based on one or more of a first lateral clearance adjacent the first wheel on the track and a second lateral clearance adjacent the second wheel on the track, torque applied by one or more of the first and second wheel motors is increased or decreased.

2. The car mover of claim 1, wherein:

wherein the adjustment data represents prior adjustments to the first and second wheel motors from prior runs of the car mover.

3. The car mover of claim 2, wherein:

from the adjustment data, the controller is configured to adjust velocity or torque of the first and second wheels relative to each other to thereby adjust an effective diameter of the first and second wheels relative to each other.

4. The car mover of claim 3, wherein:

in operation, the controller is configured to adjust one or more of velocity and torque, after an identified destination is reached, or after a predetermined period of time or operational runs is reached by the car mover.

5. The car mover of claim 3, wherein:

the adjustment data is obtained via a log of adjustments to the first and second wheel motors from prior runs of the car mover.

6. The car mover of claim 5, wherein:

the adjustment data is derived as one or more of:

a weighted average applied to the log of adjustments to the first and second wheel motors from previous runs of the car mover; and a correction factor based on the log of adjustments to the first and second wheel motors from previous runs of the car mover.

7. The car mover of claim 1, wherein:

a sensor operationally connected to the car mover is configured to sense the first lateral clearance adjacent the first wheel on the track and the second lateral clearance adjacent the second wheel on the track.

8. The car mover of claim 7, wherein:

the sensor is configured to transmit sensor data indicative of the first and second lateral clearances to the controller via a wired or wireless transmission channel.

9. The car mover of claim 8, wherein:

the sensor is configured to transmit the sensor data to the controller over the wireless transmission channel, directly or via a cloud service.

10. The car mover of claim 9, wherein:

the sensor data is configured to processed, at least in part, by one more of the sensor via edge computing, the controller, and the cloud service.

11. A method of operating a car mover for autonomously moving an elevator car along a lane in a hoistway, comprising:

applying a pinch force against a track between first and second wheels of the car mover, and rotationally driving along the track, by respective first and second wheel motors of the car mover; and executing, by a controller, a lateral clearance control self-learning module, wherein based on adjustment data, one or more operational parameters applied by one or more of the first and second wheel motors are adjusted; and executing, by the controller, a lateral clearance feedback control module, wherein based on one or more of a first lateral clearance adjacent the first wheel on the track and a second lateral clearance adjacent the second wheel on the track, torque applied by one or more of the first and second wheel motors is increased or decreased.

12. The method of claim 11, wherein:

the adjustment data represents prior adjustments to the first and second wheel motors from prior runs of the car mover.

13. The method of claim 12, comprising:

adjusting, by the controller utilizing the adjustment data, velocity or torque of the first and second wheels relative to each other to thereby adjust an effective diameter of the first and second wheels relative to each other.

14. The method of claim 13, comprising:

adjusting, in operation by the controller, one or more of velocity and torque after an identified destination is reached, or after a predetermined period of time or operational runs is reached by the car mover.

15. The method of claim 13, comprising:

obtaining the adjustment data via a log of adjustments to the first and second wheel motors from prior runs of the car mover.

16. The method of claim 15, comprising one or more of:

deriving the adjustment data as a weighted average applied to the log of adjustments to the first and second wheel motors from previous runs of the car mover; and deriving the adjustment data as a correction factor based on the log of adjustments to the first and second wheel motors from previous runs of the car mover.

17. The method of claim 11, comprising:

sensing, by a sensor operationally connected to the car mover, the first lateral clearance adjacent the first wheel on the track and the second lateral clearance adjacent the second wheel on the track.

18. The method of claim 17, comprising:

transmitting, by the sensor, sensor data indicative of the first and second lateral clearances to the controller via a wired or wireless transmission channel.

19. The method of claim 18, comprising:

transmitting, by the sensor, the sensor data to the controller over the wireless transmission channel, directly or via a cloud service.

20. The method of claim 19, comprising:

processing the sensor data, at least in part, by one more of the sensor via edge computing, the controller, and the cloud service.

* * * * *